United States Patent Office 2,904,540
Patented Sept. 15, 1959

2,904,540
PREPARATION OF DIMETHYLENE HETEROCYCLIC COMPOUNDS

Hilmer Ernest Winberg, Wilmington, Del., assignor to E. I. du Pont de Nemours and Company, Wilmington, Del., a corporation of Delaware No Drawing. Application September 24, 1953
Serial No. 382,223

6 Claims. (Cl. 260—79.7)

This invention relates to the preparation of organic compounds and, more particularly, to the preparation of dimethylene heterocyclic compounds having conjugated double bonds.

Numerous polymerizable unsaturated organic compounds are known and many of them have been polymerized into useful, high molecular weight products. Such unsaturated compounds and their polymers are useful in various applications, e.g., the monomers as chemical intermediates and the polymers as adhesives, coating compositions, plastics, and the like. All these known unsaturated compounds and their polymers are not useful for the same purposes since differences in the structure of the monomers imparts different properties to the final product. In view of these differences in individual characteristics of the different unsaturated monomers and polymers, it is highly desirable to develop still other unsaturated compounds, especially unsaturated monomers having heterocyclic structural units, in order to produce new products having specific properties or combinations of properties which would make them especially desirable in certain specific applications.

An object of the present invention is to provide a process of preparing polymerizable, ethylenically unsaturated monomers having heterocyclic structural units, and polymers thereof. A more particular object is to provide such a process for preparing dimethylene heterocyclic compounds having conjugated double bonds, and polymers thereof. A still further object is to provide such a process for preparing a new class of dimethylene heterocyclic compounds having conjugated double bonds, such compounds being included in the new class of compounds being claimed in application Serial No. 382,222, entitled "monomeric compounds and their polymers," and filed of even date herewith jointly in the names of applicant and John Lynde Anderson. Other objects of the invention will be apparent from the description given hereinafter.

The above objects are accomplished according to the present invention by pyrolyzing a five-membered heterocyclic quaternary ammonium hydroxide having in the 1-position of the heterocyclic ring an oxygen or sulfur, joined to two annular carbons, having attached to one of two carbons in any of the 2,5-, 2,3-, and 4,5-positions of the heterocyclic range a —CH$_2$N(CH$_3$)$_3$OH group and to the other of these two carbons a methyl group, and having two conjugated double bonds in the heterocyclic ring.

It has been discovered that contrary to expectations unsaturated heterocyclic quaternary ammonium hydroxides as characterized above will decompose on pyrolysis into dimethylene heterocyclic compounds having conjugated double bonds, trimethylamine, and water. The dimethylene compounds formed are spontaneously polymerizable at ordinary and moderately elevated temperatures but the monomers can be obtained by removing them from the reaction mixture as they are formed and cooling them to low temperatures, usually below 0° C. and, preferably in most instances, below —50° C.

Preferably, the process of this invention is applied to quaternary ammonium hydroxides having the formula

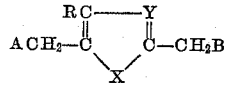

wherein X is oxygen or sulfur; Y is CR or nitrogen; R is hydrogen or an alkyl radical; and one of A and B is —N(CH$_3$)$_3$OH and the other is hydrogen. The dimethylene compound formed has the formula

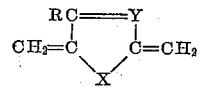

the various symbols having the meaning above. An even more restricted and preferred subgroup of the quaternary ammonium hydroxides for use in the instant process are those represented by the above formula wherein X is oxygen, R is hydrogen, Y is CH, and one of A and B is —N(CH$_3$)$_3$OH and the other is hydrogen. In the above compounds, the quaternary ammonium hydroxide group is attached to one of the two carbons in the 2,5-positions of the heterocyclic ring.

The process of this invention is also particularly useful in the pyrolysis of the isomers of the above quaternary ammonium hydroxides, namely, those represented by the formula

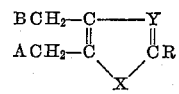

wherein the various symbols have the meaning above. In this instance, it is immaterial whether the quaternary ammonium hydroxide group is regarded as being attached to one of the two carbons in the 2,3- or the 4,5-positions of the heterocyclic ring inasmuch as the compounds having their quaternary ammonium hydroxide groups in corresponding positions with respect to the hetero atom X, i.e., in the 2- or 5- and the 3- or 4-positions would be identical in both cases. The dimethylene compound formed has the formula

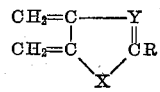

The pyrolysis of the herein considered heterocyclic quaternary ammonium hydroxides results in every instance in the formation of a dimethylene heterocyclic compound having conjugated double bonds as can be seen by consideration of the formulas above.

The pyrolysis according to this invention can be carried out over a temperature range of about 25° C. to 200° C., depending on the specific quaternary ammonium hydroxide being pyrolyzed. Some of these hydroxides are relatively unstable and may be pyrolyzed at temperatures as low as 25° C. or 30° C. Others are more stable and require temperatures in the range of 50° C. to 150° C. to produce a practical rate of pyrolysis, while still others can be pyrolyzed at temperatures up to 200° C. or even somewhat higher to advantage. The pressure at which the pyrolysis is carried out, is not critical and can range from as low as 1 mm. of mercury up to atmospheric pressure.

The dimethylene compounds formed by the pyrolysis are spontaneously polymerizable, some even at room temperature. Where the polymer of the dimethylene compound is desired, the fact the monomer may polymerize spontaneously is immaterial. However, when the dimethylene compound is desired in monomeric form, particularly where the compound is spontaneously polymerizable at room temperature, it is preferred to carry out the pyrolysis under reduced pressure, generally at a pressure not greater than 150 mm. of mercury and, preferably, at a pressure of 1 mm. to 100 mm. of mercury, remove the volatile monomer rapidly from the reaction zone, condense it at low temperature to keep the formation of polymer at a minimum, and then isolate the monomer from other volatile products which have been condensed with it. Condensing and maintaining the monomer at 0° C. or lower is advisable and, it is preferred to condense the monomer at a temperature below −50° C. such as can be conveniently provided by a solid carbon dioxide-acetone mixture.

A preferred method of carrying out the process of this invention, using 5 - methyl - 2 - furfuryltrimethylammonium hydroxide as an illustration, is as follows: the 5 - methyl - 2 - furfuryltrimethylammonium hydroxide is heated to a temperature between 50° C. and 150° C. at a pressure of 1 to 150 mm. of mercury and the volatile reaction products collected in a cold receiver, e.g., a trap cooled by solid carbon dioxide-acetone mixture. The monomeric compound, 2,5-dimethylene-2,5-dihydrofuran, in the cold receiver is dissolved in an organic solvent, e.g., diethyl ether, and dried by a solid desiccating agent, e.g., anhydrous magnesium sulfate. The organic solvent solution of the monomeric product is used directly if it is desired to make chemical derivatives of the monomer. When the solution is allowed to warm to room temperature or the solvent is removed by evaporation at room temperature or moderately elevated temperatures, the monomeric 2,5-dimethylene-2,5-dihydrofuran polymerizes spontaneously with the liberation of heat. The resulting polymeric product varies from a soft, tacky resin to a hard, high molecular weight polymer. The polymeric product can be purified by extraction with water or organic liquids which are not solvents for the polymer.

The heterocyclic quaternary ammonium hydroxides used as starting materials for the process of this invention can be obtained from the corresponding quaternary ammonium halides by reaction with silver oxide as described in detail in applicant's copending application Serial No. 382,221, filed of even date herewith and entitled "Organic Compounds," now abandoned or by other known methods.

In brief, the method described in applicant's abandoned application Ser. No. 382,221 comprises thoroughly agitating an aqueous solution of a heterocyclic quaternary ammonium halide as characterized above with at least a stoichiometrical amount of silver oxide at ordinary room temperature (20° C.-30° C.). Silver halide precipitates from the reaction mixture and the quaternary ammonium hydroxide formed remains in solution. The reaction is continued until a sample of the filtered reaction solution gives a negative test for halide ions. Reaction periods of 1 to 1½ hours at room temperature are usually sufficient. The actual time of reaction depends on the activity of the silver oxide used, the more finely-divided oxides being more reactive. The aqueous solution is filtered from the precipitated silver halide and any excess silver oxide. The filtration is preferably carried out under a blanket of an inert gas, e.g., nitrogen, since the quaternary ammonium hydroxide reacts with carbon dioxide present in the atmosphere. The filtrate is then subjected to distillation at low pressure and low temperature to remove the water from the reaction solution. It is essential that a low enough pressure be used to permit distillation of the water at a temperature sufficiently low to prevent substantial decomposition of the quaternary hydroxide. Generally, the temperature of the reaction mixture must not exceed 30° C. since the quaternary ammonium hydroxides decompose rapidly at higher temperatures. In the case of those quaternary ammonium hydroxides which are unstable at 30° C. it is necessary, if it is desired to isolate the pure hydroxide, to remove the water at lower temperatures. One way of doing this is by freeze-drying the aqueous solution.

The process of this invention can be carried out by another embodiment which is particularly useful when it is not desired to isolate the monomeric dimethylene compounds, but to obtain the polymers of these compounds directly. The quaternary ammonium hydroxide starting materials are normally obtained in aqueous solution as disclosed in applicant's application mentioned above. This alternative process employs such aqueous solutions of the quaternary ammonium hydroxides and comprises adding to the aqueous solution of the quaternary ammonium hydroxide, without going through the step of isolating the compound, an inert, water-immiscible, organic liquid which forms an azeotrope with water, removing the water by azetropic distillation of the product prior to decomposition of the quaternary ammonium hydroxide, and thereafter thermally decomposing the quaternary ammonium hydroxide and polymerizing the dimethylene heterocyclic compound without isolating the monomer. The latter two steps are preferably carried out at the temperature of the refluxing reaction mixture. Numerous water-immiscible, organic liquids which are inert to the reactants and form azeotropes with water are available, including benzene, toluene, xylene, hexane and monochlorobenzene.

The following examples in which all proportions are by weight unless otherwise stated, illustrate specific embodiments of the present invention.

*Example I*

An aqueous solution of 5-methyl-2-furfuryltrimethylammonium hydroxide (prepared from 11.7 parts of 5-methyl-2-furfuryltrimethylammonium bromide and 16 parts of silver oxide) is heated at a pressure ranging from about 30 mm. down to about 3 mm. of mercury at a maximum temperature of 30° C. to remove the water. The solid residue is then heated at 150° C. at 3–4 mm. pressure for a period of 20 minutes in a reaction vessel connected to a receiver cooled in a mixture of solid carbon dioxide and acetone. The product collected in the cold receiver is a white solid which, on warming, turns to a light yellow liquid which is 2,5-dimethylene-2,5-dihydrofuran. This liquid is dissolved in diethyl ether and dried with anhydrous magnesium sulfate.

The ether solution of monomeric 2,5-dimethylene-2,5-dihydrofuran is heated to boiling whereupon the monomer polymerizes exothermically. The resulting solid polymer of 2,5-dimethylene-2,5-dihydrofuran is filtered from the ether solution and dried. This polymer softens to a viscous melt at 120–125° C. It is swollen by boiling benzene and by dimethylformamide.

*Anal.*—Calcd. for $(C_6H_6O)_x$: C, 76.57%; H, 6.43%. Found: C, 75.63%, 75.85%; H, 6.26%, 6.33%.

*Example II*

An aqueous solution of 5-methyl-2-thenyltrimethylammonium hydroxide (prepared from 23 parts of 5-methyl-2-thenyltrimethylammonium chloride and 15.5 parts of silver oxide) is subjected to a temperature of 30° C. (maximum) at a pressure of 30–3 mm. of mercury to remove the water. The residue is then heated at 150° C. and 3 mm. mercury pressure for 10 minutes. The residue in the reaction flask, a polymer of 2,5-dimethylene-2,5-dihydrothiophene, is extracted twice with boiling water, dried and extracted with hexane. The solid polymer softens above 140° C. and becomes rubbery at 220° C. It is insoluble in boiling toluene, carbon tetrachloride, carbon disulfide or dimethylformamide.

*Anal.*—Calcd. for $(C_6H_6S)_x$: C, 65.44%; H, 5.49%; S, 29.06%. Found: C, 64.98%, 64.98%; H, 5.52%, 5.53%; S, 28.49%.

Example III

An aqueous solution of 4,5-dimethyl-2-thiazylmethyltrimethylammonium hydroxide (prepared from 6.8 parts of 4,5-dimethyl-2-thiazylmethyltrimethylammonium chloride and 7 parts of silver oxide) is heated under a pressure of 30–3 mm. mercury at a maximum temperature of 30° C. to remove water. The residue is heated at 150° C. and 3 mm. mercury pressure for a period of one-half hour. The residue is extracted with boiling water. The resulting product is a polymer of 2,5-dimethylene-4-methyl-2,5-dihydrothiazole and is a soft, tacky resin.

Example IV

An aqueous solution of 3-methyl-2-thenyltrimethylammonium hydroxide (prepared from 20.6 parts of 3-methyl-2-thenyltrimethylammonium chloride and 23.1 parts of silver oxide) is heated at a maximum temperature of 30° C. at a pressure ranging from 30 mm. to 3 mm. of mercury to remove the water. The residue is heated up to a temperature of 150° C. at a pressure of 3–6 mm. of mercury until the evolution of trimethylamine ceases. The volatile decomposition products are collected in a receiver cooled by a solid carbon dioxide-acetone mixture. A polymer of 2,3-dimethylene-2,3-dihydrothiophene forms as a white opaque film in the receiver. This polymer becomes transparent when heated above 70° C. It does not melt below 160° C.

Anal.—Calcd. for $(C_6H_6S)_x$: C, 65.44%; H, 5.49%. Found: C, 65.05%, 64.90; H, 5.49%, 5.58%.

Example V

A solution of 15 parts of 5-methyl-2-thenyltrimethylammonium iodide (prepared by reductive amination of 5-methyl-2-thenaldehyde to 5-methyl-2-thenyldimethylamine and quaternization of the amine with methyl iodide) in 40 parts of water is agitated with 11.6 parts of silver oxide for 1 hour at room temperature. The mixture is filtered under nitrogen and the filtrate is charged to a flask fitted with a stirrer, condenser and water separator. To the quaternary hydroxide solution is added 360 parts of toluene. The mixture is heated with vigorous stirring and the water is removed by azeotropic distillation over a period of one-half hour. Stirring and refluxing is continued for an additional one-half hour during which time the quaternary hydroxide decomposes. The solution is then filtered hot to remove a trace of silver salts. The polymer which precipitates on cooling is isolated by filtration and dried. There is obtained 1.1 parts of polymer of 2,5-dimethylene-2,5-dihydrothiophene softening above 140° C. to a viscous melt.

This example illustrates the process of this invention wherein the polymer is formed directly without isolation of the monomeric compound.

It will be understood the above examples are merely illustrative and that the present invention broadly comprises preparing dimethylene heterocyclic compounds having conjugated double bonds, by pyrolyzing five-membered heterocyclic quaternary ammonium compounds having in the 1-position of the heterocyclic ring an oxygen or sulfur joined to two annular carbons, having attached to one of two carbons in any of the 2,5-, 2,3-, and 4,5-positions of the heterocyclic ring a —CH$_2$N(CH$_3$)$_3$OH group and to the other of these two carbons a methyl group, and having two conjugated double bonds in the heterocyclic ring.

The instant process is applicable to any heterocyclic quaternary ammonium hydroxide as characterized above and will effect the formation of readily polymerizable dimethylene heterocyclic compounds having conjugated double bonds. Other specific quaternary ammonium hydroxides well suited for pyrolysis according to the present invention include 5-methyl-2-thiazylmethyltrimethylammonium hydroxide, 4,5-dimethyl-2-thenyltrimethylammonium hydroxide, 3-ethyl-5-methyl-2-furfuryltrimethylammonium hydroxide, 3,4,5-trimethyl-2-furfuryltrimethylammonium hydroxide, and 3-methyl-2-furfuryltrimethylammonium hydroxide.

Additional examples of specific dimethylene heterocyclic compounds which can be prepared according to this invention include, 4-tert.-butyl-2,5-dimethylene-2,5-dihydrofuran and its polymers, and 2,3-dimethylene-2,3-dihydrofuran and its polymers.

This invention provides a means of preparing monomeric dimethylene heterocyclic compounds and polymers thereof. These polymers are linear addition polymers and, as shown by the examples, can be readily prepared without the use of polymerization initiators.

The products of this invention are useful for various purposes. The monomeric dimethylene heterocyclic compounds are useful as chemical intermediates. For example, a cold ether solution of 2,5-dimethylene-2,5-dihydrofuran can be reacted with iodine to give the 2,5-bis(iodomethyl) furan. This diiodo compound can in turn be reacted with trimethylamine to form 2,5-furandimethylenebis(trimethylammonium iodide). The monomeric 2,5-dimethylene-2,5-dihydroheterocyclic compounds can also be converted to cyclic dimers by heating the monomers in the presence of a polymerization inhibitor as described in further detail in applicant's application Serial No. 382,224, filed of even date herewith, now abandoned and entitled "Cyclic Dimers of Organic Compounds," a continuation-in-part of said application having been filed on January 21, 1958 as Serial Number 710,182. The polymeric products of this invention are useful in such applications as adhesives, coating compositions, plastics, films, and fibers.

As many apparently widely different embodiments of this invention may be made without departing from the spirit and scope thereof, it is to be understood that the invention is not limited to the specific embodiments thereof except as defined in the appended claims.

The invention claimed is:

1. Process of preparing dimethylene heterocyclic compounds having conjugated double bonds which comprises pyrolyzing at a temperature in the range of about 25° C. to 200° C. under subatmospheric pressure a five-membered heterocyclic quaternary ammonium hydroxide selected from the group consisting of compounds having the formula

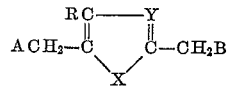

and compounds having the formula

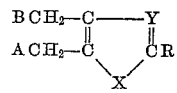

wherein X is selected from the group consisting of oxygen and sulfur; Y is selected from the group consisting of CR and nitrogen, with the proviso that when X is oxygen Y must be CR; R is selected from the group consisting of hydrogen and alkyl radicals; and one of A and B is —N(CH$_3$)$_3$OH and the other is hydrogen.

2. Process of preparing 2,5-dimethylene-2,5-dihydrofuran which comprises pyrolyzing at a temperature in the range from 25 to 200° C. and under subatmospheric pressure 5-methyl-2-furfuryltrimethylammonium hydroxide.

3. A process for preparing 2,5-dimethylene-2,5-dihydrothiophene which comprises pyrolyzing at a temperature in the range from 25 to 200° C. and under subatmospheric pressure 5-methyl-2-thenyltrimethylammonium hydroxide.

4. Process for preparing 2,5-dimethylene-4-methyl-2,5-dihydrothiazole which comprises pyrolyzing at a temperature in the range from 25 to 200° C. and under subatmospheric pressure 4,5-dimethyl-2-thiazylmethyltrimethylammonium hydroxide.

5. Process for preparing 2,3-dimethylene-2,3-dihydrothiophene which comprises pyrolyzing at a temperature in the range from 25 to 200° C. and under subatmospheric pressure 3-methyl-2-thenyltrimethylammonium hydroxide.

6. Process of preparing homopolymers of dimethylene heterocyclic compounds which comprises adding an inert, water-immiscible organic liquid capable of forming an azeotrope with water, to an aqueous solution of a five-membered heterocyclic quaternary ammonium hydroxide selected from the group consisting of compounds having the formula

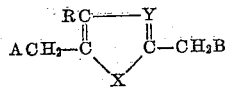

and compounds having the formula

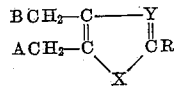

wherein X is selected from the group consisting of oxygen and sulfur; Y is selected from the group consisting of CR and nitrogen, with the proviso that when X is oxygen Y must be CR; R is selected from the group consisting of hydrogen and alkyl radicals; and one of A and B is $-N(CH_3)_3OH$ and the other is hydrogen; azeotropically distilling the mixture to remove water therefrom, thermally decomposing said quaternary ammonium hydroxide and thermally polymerizing the monomeric dimethylene compound formed by decomposition of said quaternary ammonium hydroxide.

References Cited in the file of this patent
UNITED STATES PATENTS
2,185,220    Nabenhauer _____ Jan. 2, 1940

OTHER REFERENCES

Zenoni: "Gazz. Chim. Ital.," vol. 20, pages 513–17 (1890).

Beilstein: "Hand. der. org. Chem.," vol. XVIII, page 585; 1st supp., page 555 (1934); 2nd supp. page 417 (1952).